US009393891B2

(12) United States Patent
Beier (10) Patent No.: US 9,393,891 B2
(45) Date of Patent: Jul. 19, 2016

(54) VEHICLE SEAT WITH FORM-ADJUSTABLE SIDE WINGS (71) Applicant: GRAMMER AG, Amberg (DE)

(72) Inventor: Wolfgang Beier, Rieden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/626,666

(22) Filed: Feb. 19, 2015

(65) Prior Publication Data
US 2015/0231998 A1 Aug. 20, 2015

(30) Foreign Application Priority Data

Feb. 20, 2014 (DE) .......................... 10 2014 002 211

(51) Int. Cl.
*A47C 7/14* (2006.01)
*B60N 2/44* (2006.01)
*B60N 2/58* (2006.01)
*B60N 2/70* (2006.01)

(52) U.S. Cl.
CPC ............ *B60N 2/4492* (2015.04); *B60N 2/4415* (2013.01); *B60N 2/58* (2013.01); *B60N 2/7017* (2013.01)

(58) Field of Classification Search
CPC ...... B60N 2/4492; B60N 2/4415; B60N 2/58; B60N 2/7017
USPC ................. 297/248.6, 284.9, 452.33, 452.34, 297/452.35, 452.36, 452.37, 216.13, 284.6
See application file for complete search history.

(56) References Cited

U.S. PATENT DOCUMENTS

| 4,589,695 | A | * | 5/1986 | Isono | ...................... | A47C 7/022 |
| | | | | | | 297/284.9 X |
| 4,883,320 | A | * | 11/1989 | Izumida | ............... | B60N 2/7094 |
| | | | | | | 297/452.34 X |
| 5,280,997 | A | * | 1/1994 | Andres | ................... | A47C 7/467 |
| | | | | | | 297/284.6 |
| 5,441,331 | A | * | 8/1995 | Vento | ....................... | B60N 2/10 |
| | | | | | | 297/452.33 X |
| 5,707,109 | A | * | 1/1998 | Massara | ............... | B60N 2/4415 |
| | | | | | | 297/284.9 |

(Continued)

FOREIGN PATENT DOCUMENTS

DE 202007010957 1/2008
DE 102010011886 9/2011

(Continued)

OTHER PUBLICATIONS

Official Action for German Patent Application No. 102014002211.0, dated Sep. 18, 2014, 2 pages.

(Continued)

*Primary Examiner* — Rodney B White
(74) *Attorney, Agent, or Firm* — Sheridan Ross P.C.

(57) ABSTRACT

A vehicle seat has a seat cushion upholstery part and a backrest upholstery part, and the seat cushion upholstery part and/or backrest upholstery part is bordered on each of the left and right sides by a deformable side bolster for 5 supporting a vehicle seat occupant. Further, each side bolster comprises at least one cushion deformable in the seat width direction and at least one upholstery portion into which the at least one cushion is embedded, and a wear-resistant fabric is embedded two-dimensionally into the foam of the at least one foam upholstery portion for its stabilization and at least partially covering the at least one embedded cushion, and, in at least one 10 part of the area covered by the wear-resistant fabric, the fibers of the wear-resistant fabric are oriented at a non-zero-degree angle to the seat width direction.

12 Claims, 5 Drawing Sheets

(56) References Cited

U.S. PATENT DOCUMENTS

| | | | | |
|---|---|---|---|---|
| 5,988,757 A * | 11/1999 | Vishey | ............ | B60N 2/23 297/452.36 X |
| 6,019,428 A * | 2/2000 | Coffield | ............ | A47C 7/46 297/284.9 X |
| 6,095,602 A * | 8/2000 | Umezawa | ............ | B60R 21/207 297/216.13 X |
| 6,129,419 A * | 10/2000 | Neale | ............ | B60N 2/4415 297/284.6 X |
| 6,332,651 B1 * | 12/2001 | Horisawa | ............ | A47C 7/742 297/219.1 |
| 7,252,341 B2 * | 8/2007 | Kircher | ............ | B60N 2/449 297/452.34 X |
| 7,600,821 B2 * | 10/2009 | Yasuda | ............ | A47C 1/02 297/452.29 |
| 7,641,281 B2 * | 1/2010 | Grimm | ............ | B60N 2/449 297/284.9 X |
| 7,726,739 B2 * | 6/2010 | Wain | ............ | B60N 2/449 297/284.9 X |
| 8,136,883 B2 * | 3/2012 | Rehfuss | ............ | B60N 2/4415 297/284.6 |
| 8,474,862 B2 * | 7/2013 | Pursche | ............ | B60R 21/0134 297/284.9 X |
| 8,727,374 B1 * | 5/2014 | Line | ............ | B60R 21/207 280/728.3 |
| 8,905,431 B1 * | 12/2014 | Line | ............ | B60R 21/215 280/728.2 |
| 9,045,063 B2 * | 6/2015 | Line | ............ | B60N 2/449 |
| 9,096,157 B2 * | 8/2015 | Line | ............ | B60N 2/5642 |
| 9,102,252 B2 * | 8/2015 | Sugiyama | ............ | B60N 2/4415 |
| 9,126,504 B2 * | 9/2015 | Line | ............ | B60N 2/4838 |
| 9,126,508 B2 * | 9/2015 | Line | ............ | B60N 2/2222 |
| 9,193,284 B2 * | 11/2015 | Line | ............ | B60N 2/449 |
| 9,216,677 B2 * | 12/2015 | Line | ............ | B60N 2/6027 |
| 2006/0152062 A1 * | 7/2006 | Archambault | ............ | B60N 2/449 297/452.34 |
| 2007/0057551 A1 * | 3/2007 | Lachenmann | ............ | B60N 2/449 297/284.9 |
| 2008/0136237 A1 * | 6/2008 | Kayumi | ............ | B60N 2/449 297/284.9 |
| 2010/0090448 A1 * | 4/2010 | Pursche | ............ | B60R 21/0134 297/284.9 X |
| 2010/0201178 A1 * | 8/2010 | Mizobata | ............ | B60N 2/5891 297/452.35 |

FOREIGN PATENT DOCUMENTS

| | | | | |
|---|---|---|---|---|
| DE | 102010021067 | | 11/2011 | |
| FR | EP 229737 A2 * | | 7/1987 | ............ B60N 2/4415 |
| FR | EP 343025 A1 * | | 11/1989 | ............ B60N 2/4415 |
| GB | 2468568 | | 9/2010 | |

OTHER PUBLICATIONS

Search Report for European Patent Application No. 15155797.2, dated Jun. 24, 2015, 3 pages.

* cited by examiner

VEHICLE SEAT WITH FORM-ADJUSTABLE SIDE WINGS

CROSS-REFERENCE TO RELATED APPLICATIONS

This application claims the benefit of German Application No. 10 2014 002 211.0 filed Feb. 20, 2014, the contents of which are incorporated herein by reference.

DESCRIPTION

The invention relates to a vehicle seat with a seat cushion upholstery part and a backrest upholstery part, wherein said seat cushion upholstery part and/or backrest upholstery part is bordered on each of the left and right sides by a deformable side bolster for supporting a vehicle seat occupant, wherein each side bolster comprises at least one laterally deformable cushion and at least one upholstery portion into which the at least one cushion is embedded. Such vehicle seats are predominantly used in commercial vehicles for use on rough terrain, e.g. in large goods vehicles or tractors. This increases both the comfort and the safety of a vehicle upon sideways shocks.

BACKGROUND

Known from prior art are vehicle seats with a backrest upholstery part the backrest upholstery part being bordered on each of the left and right sides by an inflatable, deformable side bolster. Such side bolsters typically comprise an inflatable cushion that is embedded into a foam upholstery segment. Typically, air can be pumped into or out of the cushion using a pumping device, by which the shape of the side bolster can be adapted to the body of a vehicle seat occupant. In this process, the foam upholstery segment becomes elastically expanded. Furthermore, publication DE 10 2009 012 620 A1 describes a mechanical apparatus that can push the side bolsters together from the outside and thereby vary their shape. The disadvantage of all prior-art embodiments is that frequent expansion and contraction of the foam upholstery segment leads to signs of wear. Cracks are often a result.

Accordingly, the purpose of the present invention is to improve the wear resistance of deformable side bolsters, in particular with regard to the formation of cracks.

SUMMARY

This purpose is fulfilled by a vehicle seat with a seat cushion upholstery part and backrest upholstery part, wherein said seat cushion upholstery part and/or backrest upholstery part is bordered on each of the left and right sides by a deformable side bolster for supporting a vehicle seat occupant, wherein each side bolster comprises at least one cushion deformable in the 5 seat width direction and at least one upholstery portion into which the at least one cushion is embedded, wherein a fiber fabric is embedded two-dimensionally into the foam of the at least one foam upholstery portion for its stabilization and at least partially covering the at least one embedded cushion, and wherein, in at least one part of the area covered by the fiber fabric, the fibers of the fiber fabric are oriented at a non-zero-degree angle to the plane extending in the seat width direction and in the elevation direction of the side bolster.

Elevation direction of the side bolster refers here to a direction that is orthogonal to both the length and width direction of either the seat cushion upholstery part or the backrest upholstery part. The term "elevation direction" designates the directional orientation of a shape elevation that is not necessarily identical to the direction of expansion upon deformation of the side bolster. For the side bolsters of the seat cushion, the elevation direction of the side bolsters is essentially upwards. For the side bolsters of the backrest, the elevation direction of the side bolsters is essentially forwards. An expansion upon deformation is mainly inwards in the seat width direction and only partially in the elevation direction.

Upon expansion of the cushion in the seat width direction, a fiber that is oriented in the plane extending in the seat width direction and in the elevation direction would limit the expansion of the wear-resistant fiber fabric to the fundamental extensibility of the fiber. The advantage of a non-zero-degree angle in the seat width direction is that the fiber fabric overall can stretch further than the fibers constituting the fiber fabric. The fibers nevertheless still stabilize the foam material of the upholstery portion and act against wear and crack formation. This has the advantage of allowing greater stretching of the embedded fiber fabric controlled by the angle of the fibers to the direction of movement, and that the foam material in conjunction with the fiber fabric is thus more resistant to cracking. In zero-degree orientation, the fibers normally exhibit almost no stretch. By defining the angle, the amount of possible stretch can therefore be optimally adapted to the stretching of the foam part and/or the wear behavior of the foam part respectively.

Advantageously, in at least one part of the area covered by the fiber fabric, the fibers of the fiber fabric are at an angle of greater than 15°, preferably greater than 25°, and even more preferably greater than 40° to the plane extending in the seat width direction and in the elevation direction of the side bolster. Also advantageously, in at least part of the area covered by the fiber fabric, the fibers of the fiber fabric are at an angle of less than 75°, preferably less than 65°, and even more preferably less than 50° to the plane extending in the seat width direction and in the elevation direction of the side bolster. The greater the angle of a fiber direction to the plane extending in the seat width direction and in the elevation direction, the more expandable is the foam material. At the same time, however, the stabilizing action of the fibers on the foam material decreases if the fibers are at too small an angle to one another. If one assumes two fiber directions essentially orthogonal to each other, an embodiment with one of the fibers at a zero-degree angle to said plane would have the least expandability. In the case of two fiber directions that are each essentially at an angle of 45° to said plane and orthogonal to each other, an optimum is achieved at an angle of approximately 45°, since the resulting diamond shapes shift relatively to one an-other upon expansion.

Preferably, the fiber fabric is a mesh grid with parallelogram-shaped, diamond-shaped, rectangular or square meshes. Various other polygonal shapes are also conceivable. Especially advantageous is a mesh grid with square meshes. Orienting the fiber directions orthogonally to one another stabilizes the foam upholstery portion very homogeneously upon expansion. At the same time, the two fiber directions can be arranged at an angle of 45° to the plane extending in the seat width direction and in the elevation direction. In this way, the expandability of the foam upholstery portion is optimized with regard to the fibers.

The advantageous fibers thickness is between 0.1 and 3 mm, preferably between 0.2 and 1.5 mm, and more preferably between 0.5 and 1.2 mm.

It is conceivable for the fibers to be oriented in essentially two fiber directions and to be arranged at a regular spacing of between one millimeter and two centimeters, preferably between two millimeters and one centimeter, and more preferably between 2.5 and 5 millimeters.

Advantageously, the respective side bolster is constructed as a bolster extending in the upholstery length direction, i.e. in the seat height direction in the case of the backrest upholstery part and in the seat length direction in the case of the seat cushion upholstery part, and becoming narrower in the elevation direction, and which borders the sides of the seat cushion upholstery part or respectively the backrest upholstery part and which serves as a side support for a vehicle seat occupant. Preferably, the thickness of the side bolster in the seat width direction is relatively narrow and its inner side in the seat width direction has a suitable ergonomic shape for typical vehicle seat occupants. It is conceivable for the highest elevation in the seat width direction to form a clear edge and to extend in the upholstery length direction with the side bolster. This edge can advantageously lie in the middle of the side bolster in the seat width direction. However, it is also conceivable for it to lie further outward in the seat width direction, in order to ensure stronger bolstering and more comfort. Advantageously, however, this edge can lie further inward relative to the middle of the side bolster in the seat width direction in order to ensure greater sideways support.

A side bolster typically comprises the foam upholstery segment covered on one side facing the vehicle seat occupant by a material, for example textile or leather. On one side of the foam facing away from the vehicle seat occupant, which can be defined as the inside of a side bolster and which faces an inner framework of the seat, the padding of a side bolster has a hollow space tapered in the elevation direction relative to the seat width direction and extending towards an edge running in the upholstery length direction, into which the at least one cushion is embedded such that, upon deformation of the at least one cushion and relative to the hollow space, one portion of the foam on the inner side in the seat width direction and one portion of the foam on the outer side in the seat width direction are pressed away from each other.

Preferably, the highest elevation of such a side bolster is in the middle in the upholstery length direction. It is conceivable for it to be essentially semi-circular or semi-elliptical in shape. Advantageously, such a side bolster shape on the backrest adapts optimally to the waist of a vehicle seat occupant. It is also conceivable, however, for the respective side bolster to have, in the length direction, an essentially constant elevation in the elevation direction of the side bolster.

Advantageously, the fiber fabric is embedded adjacent to the at least one cushion on the inner side of the upholstery portion.

Preferably, the respective at least one cushion is inflatable. A conceivable material for said cushion is a film-like plastic material such as PVC or polyurethane. Advantageously, the cushion has an edge on the side facing the upholstery segment in the elevation direction that ensures that the cushion, when filled with a fluid, in particular compressed air, primarily expands in the seat width direction and less or not at all in the elevation direction. A conceivable length of the cushion in the length direction is in the range between 3 and 50 cm, preferably between 5 and 30 cm, and even more preferably between 15 and 25 cm. The expansion of the cushion in the elevation direction is advantageously between 3 and 20 cm, and more preferably between 5 and 12 cm. Preferably, the highest elevation of the cushion in the elevation direction is in the middle in the length direction.

Between the cushion and upholstery segment it is conceivable to have a nonwoven material, preferably fashioned as a nonwoven material pocket. This serves to reduce the stressing of the foam upholstery portion due to friction during the elastic expansion or contraction of the cushion.

Preferably, the vehicle seat according to the invention has a pump mechanism connected via a hose line to the respective at least one cushion in order to pump a fluid, in particular compressed air, into the cushion and out of the cushion. It is conceivable to have a manometer on the pump mechanism. Advantageously, the pump mechanism has a control device that automatically adapts the contour of a side bolster to the body of a vehicle seat occupant according to the pressure reading.

It is conceivable for the cushion according to the invention to consist of two partial chambers extending lengthwise in the elevation direction of the upholstery portion, wherein the two partial chambers are joined in hinge-like fashion in the elevation direction of the upholstery portion such that the upholstery portion is pressed laterally outward in hinge-like fashion upon filling.

Preferably, the fiber fabric according to the invention consists of two partial areas joined together in the midsection of an edge that lies together with the edge of the hollow space, wherein the shape of the partial area of the fiber fabric located on the inner side of the seat relative to the respective at least one cushion, in the seat width direction, is fashioned to the shape of the corresponding side of the cushion, while the outer partial area in the two outer sections of the edge overlaps in such a way that protruding partial area sections can be folded over the edge onto the inner side, where they then overlap with the other partial area section.

A conceivable material of the fiber fabric is a plastic or textile material.

Further advantageous embodiments are apparent from the accompanying drawings.

DETAILED DESCRIPTION

Figure 1:
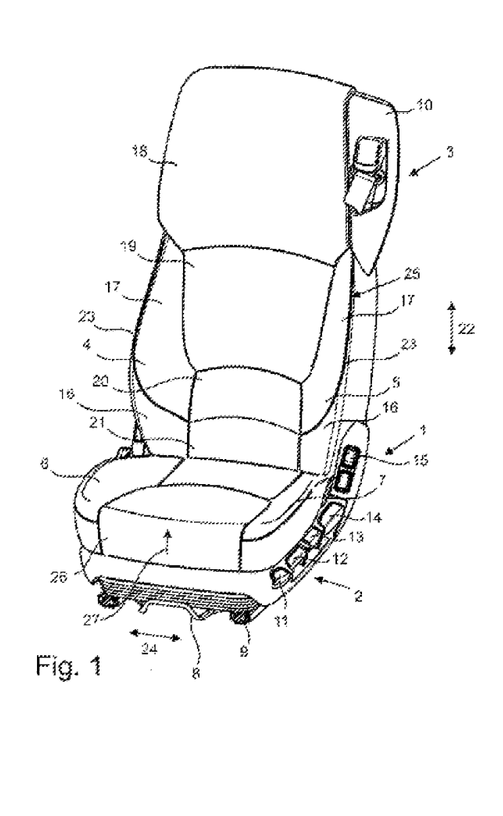
FIG. 1 A vehicle seat with side bolsters known from the state of the art.

FIG. 1 shows a vehicle seat 1 known from the state of the art with a seat cushion upholstery part 2 and a backrest upholstery part 3, in which both the seat cushion upholstery part 2 and the backrest upholstery part 3 are bordered on each of the left and right sides by a side bolster 4, 5, 6, 7 for supporting a vehicle seat occupant. A seatbelt mount is fastened above and beside the backrest upholstery part 3. Under the seat in the middle is a handle 8 with which 10 the seat can be slid longitudinally on rails 9. On the outer side in the seat width direction beside one of the side bolsters 4, 5, 6, 7 is a cover of a seatbelt exit point on the back 10 with a series of buttons, levers, handles or switches 11, 12, 13, 14, 15.

In this embodiment, the side bolsters 4, 5, 6, 7 of the backrest upholstery part 3 are each divided into a lower side bolster upholstery segment 16 and an upper side bolster upholstery segment 17. The backrest upholstery part 2 is divided into a series of upholstery segments, an upper backrest upholstery segment 18, a middle backrest upholstery segment 19 and two lower backrest upholstery segments 20, 21.

The respective segments border one another at seams. In this preferred embodiment, extending along a length direction 22 of the backrest upholstery part, the edge 23 of the side bolsters 4, 5, 6, 7 of the backrest upholstery part is located far outside in the seat width direction 24. In this way, the upholstery thickness in the elevation direction 25 of the upholstery segments in the seat width direction 24 decreases very gradually from the outer side to the inner side to the lower backrest upholstery segments 20, 21, forming a shell shape. The width of the lower backrest upholstery segments 20, 21 in the seat width direction 24 is smaller than the width of the middle backrest upholstery segment 19, which extends above the lower backrest upholstery segments 20, 21 and widens towards the top. The side bolsters 4, 5, 6, 7 of the backrest upholstery part 3 extend in the upholstery length direction 22 of the backrest upholstery part 30 on the outer side beside the lower backrest upholstery segments 20, 21 and the middle back-rest upholstery segment 19. In this way, the upper side bolster segment 17 tapers upwards in the seat width direction 24 along the upholstery length direction 22 beside the middle backrest upholstery segment 19. In this way, the side bolsters beside the lower backrest upholstery segments 20, 21 can advantageously push into the waist of a vehicle seat occupant and sup-port the occupant there laterally. Above, the widened middle backrest upholstery segment 19 and the upward-tapering upper side bolster segments 17 provide space for the back of a vehicle seat occupant.

The upper backrest upholstery segment 18 is arranged at the very top of the backrest upholstery part 3 adjacent to the middle backrest upholstery part 19 and is wider in the seat width direction than that below it.

The seat cushion upholstery part is divided into two seat cushion upholstery segments 26, wherein the front segment tapers towards the back and also reduces in thickness in the elevation direction 27 towards the back such that, again, a shell shape is formed. The side bolsters 6, 7 that border the seat cushion upholstery part 2 on the sides are built as single parts in this embodiment.

Figure 2:
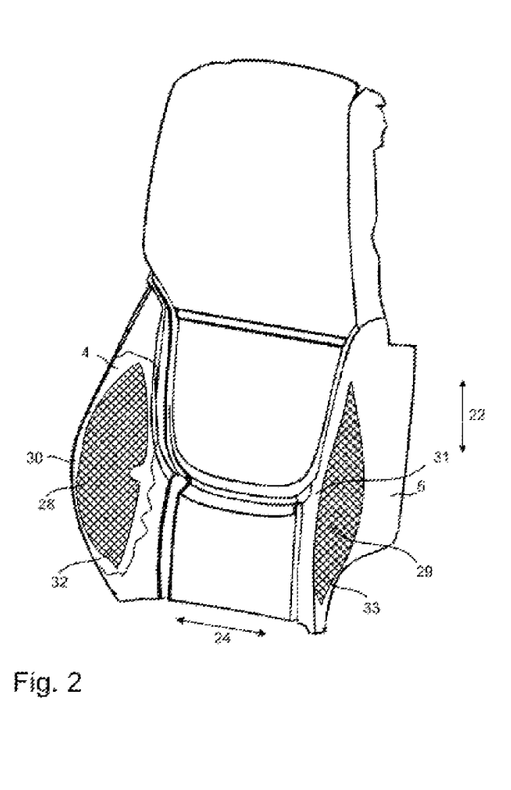
FIG. 2 An example of a backrest upholstery part according to the invention with the contours of the inlaid fiber fabric shown.

FIG. 2 shows a backrest upholstery part 3 according to the invention with a side bolster on the left and right side 5. The embodiment essentially follows the features of the backrest upholstery part 3 in FIG. 1. Shown are the contours of the cushions 28, 29 embedded into the side bolsters 4, 5, each embedded into an upholstery portion 30, 31 and partially covered by a fiber fabric 32. A seat width direction 24 and a backrest upholstery length direction 22 are given. The cushions 28, 29 each have the shape of two superimposed semicircles, which are joined superimposed at the round edge and create the shape of a pocket at the straight edge. In this way, the straight edges face the inner framework of the backrest upholstery part such that the round edge is arranged in the elevation direction 25 and the surfaces face inwards and outwards in the seat width direction. Accordingly, the side bolsters 4, 5 have an elevation pro-file along the backrest upholstery length direction 22 that becomes thicker towards the waist area of a vehicle seat occupant and then thinner again.

Figure 3:
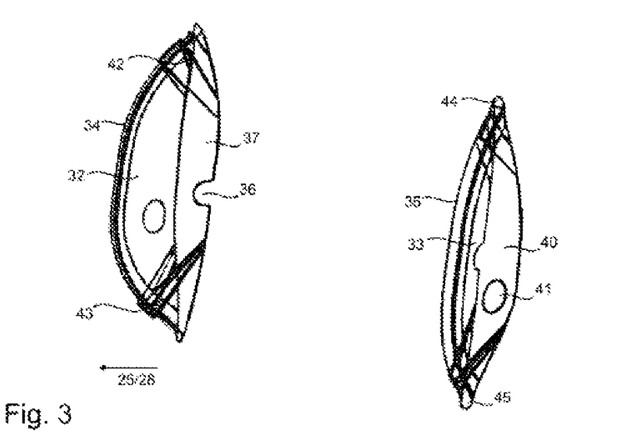
FIG. 3 Two perspective drawings of the shape of a fiber fabric according to the invention.

FIG. 3 shows an example embodiment according to the invention of the contours of the fiber fabric 32, 33 surrounding the respective cushion 28, 29 in perspective views. These each have an edge 34, 35 that separates the respectively inner partial area 37, 39 in the seat width direction and the outer partial area 38, 40 in the seat width direction and which is arranged on the outer side in the elevation direction 25, 28. In the inner partial areas 37, 39, a semicircular opening 36 is cut out on the flat edge of the semicircle approximately at the center of the imagined full circle. This is suitable, for example, for guiding the hose of a pump mechanism into the inside of the fiber fabric at this point. Furthermore, on the outer partial areas 38, 40, a circular opening 41 is cut out approximately in the middle of the lower quadrant. This can be used advantageously for fastening purposes. It is also conceivable for this circular opening 41 to be used for a better connection with the foam material. The lines on the corners 42, 43, 44, 45 indicate a material thickness in a preferred embodiment. For example, diagonally running, thicker fiber are conceivable here in order to prevent tears at the corners of the textile fabric. Furthermore, the textile fabric is advantageously doubled at at least one 10 or more of these corners.

Figure 4:
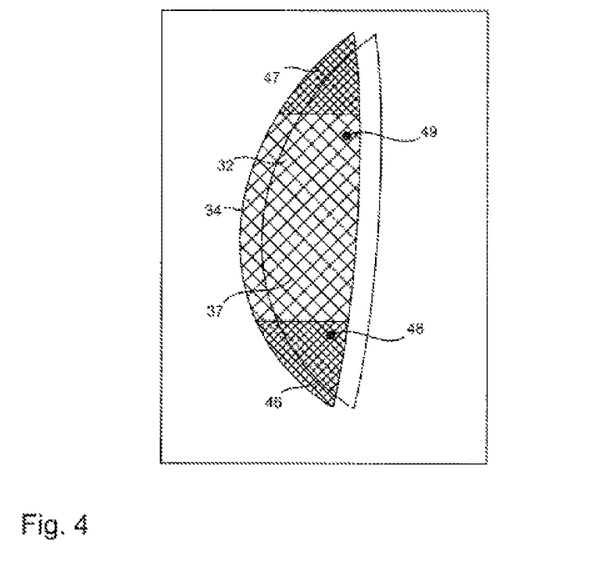
FIG. 4 A foaming tool with blade, surrounded by a textile fiber fabric.

FIG. 4 shows a fiber fabric 32 in a foaming tool. The fiber tissue is draped over the "blade" in the foaming tool and subsequently embedded in foam. A cushion 28 later comes at the position of the blade, wherein the inner partial area 37 in the seat width direction is visible in relation to the edge 34. The shape of the inner partial area 37 is fashioned to the shape of the cushion 28. The outer partial area 38 (not visible), however, in the two outer areas 46, 47, hangs over the shape of the outer partial area 38, such that overhanging partial area sections 46, 47 are folded over the edge 34 onto the inner partial area 37, where they overlap with the inner partial area section 37 as shown in the figure. Furthermore, fasteners 48, 49 are shown, by the help of which the fiber fabric is advantageously fastened to the foaming tool. In this embodiment, the fasteners 48, 49 are small bolts by which the mesh is tensioned and held. The fiber fabric has corresponding round openings. The fiber fabric is tensioned or fastened through these openings until the foam part is removed after the foaming process. In its embedded state, the fibre fiber fabric or wear protection respectively holds form-fittingly inside the foam part.

Figure 5:
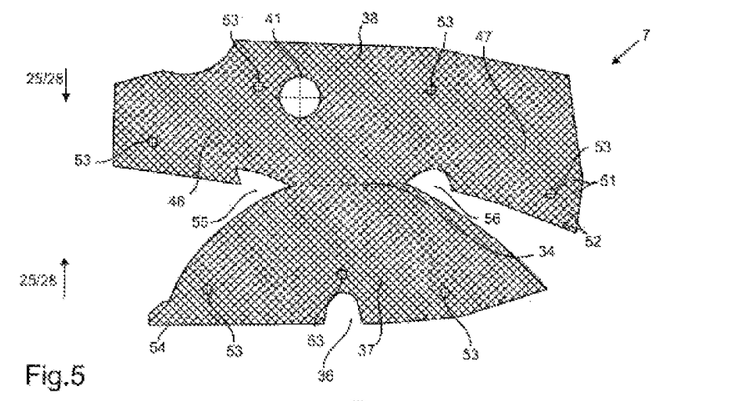
FIG. 5 A rolled textile fiber fabric according to the invention.

FIG. 5 shows a particularly advantageous embodiment of the fiber fabric 32 according to the invention, rolled up. The partial area 37 typically on the inner side in the seat direction is separated by the edge 34 of the partial area 38 on the outer side in the seat direction. While the inner partial area 37 in the seat width direction is fashioned to the shape of the cushion 28, the outer partial area 38 hangs over the edge 34 in the two outer partial areas 46, 47 in such a way that overhanging partial area sections 46, 47, as FIG. 4 shows, can be folded over the edge 34 onto the inner partial area 37. The elevation direction 25, 28 is given in FIG. 5 for better orientation. The fibers 51 in this embodiment according to the invention form a mesh grid with square-shaped meshes 52. These are arranged at an angle of 45° to the elevation direction 25, 28. In this advantageous embodiment, the shape of the cushion 28, to which the inner partial area 37 is fashioned, is roughly a semicircle. As already shown in FIGS. 3 and 5 4, a semicircular opening 36 exists about in the middle of the straight border of the semicircle of the inner partial area 37. From the semicircular opening 36, somewhat in the direction of the edge 34, is a small, circular fastener 53. Further fasteners 53 are to be found towards the border corners. The inner partial area 37 of the fiber fabric 32 does not fill an entire semicircle.

A piece of one border corner is cut out at an angle between 10 and 20°. The beginning of the cut is at a distance from the semicircular opening 36 towards the imagined border corner of between half and ⅔ of the circle radius. At the other border corner, the inner partial area 37 has a small projection 54 in the radial direction, which is trapezoidal in shape.

In this advantageous embodiment, the outer partial area 38 is slightly reminiscent of the semicircular form of the cushion 28. However, it essentially encompasses this semicircular form and extends beyond it. If one extends the line of the edge 34 in both directions, then this line approximates the border shape of the outer partial area 38, which is roughly rectangular and is about 1.1 to 1.2 times longer than the largest expansion of the straight border line of the semicircle of the inner partial area 37. On the side where the inner partial area 37 has a trapezoidal projection 54, the outer border is somewhat smaller than rectangular. From the edge 34, the extended outer border line is formed as a diagonal at an angle of between 5 and 15°. Directly adjacent to the edge 34, however, is still a small recess 55, which has the advantageous effect that the overhanging textile area 46 can be better folded over the edge 34 as shown in FIG. 4. On the other side, continued from edge 34, the area of the textile fabric is larger than rectangular and the outer border line extends from the edge 34 as a diagonal at an angle of between 15 and 25°. Again, there is a recess 56 here, which has the advantageous effect that the over-hanging textile area 47 can be better folded over the edge 34. There are also fasteners 53 on the outer partial area 38. Two of these are located, relative to the perpendiculars to border 34, symmetrically near the edge running opposite the elevation direction 25, 28 at a spacing of between ⅓ and ½ of the expansion from the middle in the length direction. The other two are located on the outer side in the length direction near the corners of the border in the elevation direction 25, 28 on the outer side. A circular opening is located in the outer partial area 38 from the middle of the expansion in the elevation direction 25, 28 displaced somewhat opposite this direction and displaced somewhat from the middle in the length direction of the side bolster 57. The two corners of the outer partial area, which border on the edge opposite from edge 34, also deviate somewhat from rectangular shape. For example, one corner is somewhat shifted towards edge 34 and the adjacent lines are bent in this direction. The fold edge on the border opposite edge 34 is at about between ⅓ and ½ of the distance from the middle to the corner of the imagined rectangle. At the other corner of the imagined rectangle, a shape is cut out that is fashioned in approximately a half-keyhole shape. In this way, the head of this keyhole points in the length direction of the side bolster 57 towards the middle.

Figure 6:
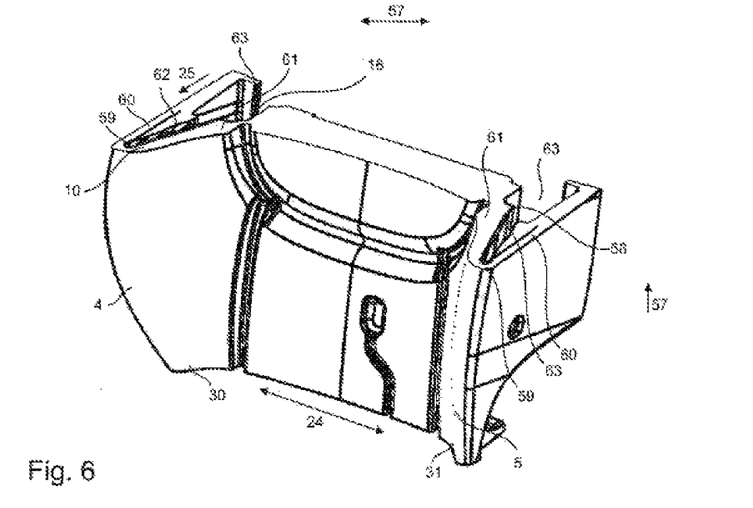
FIG. 6 An example of a backrest upholstery part according to the invention, cut in a horizontal plane at mid-height of the side bolsters.

FIG. 6 shows the bottom part of a backrest upholstery part 3 with side bolsters 4, 5 cut in a horizontal plane at mid-height of the side bolsters 4, 5. On a reverse side 58 of the backrest upholstery 2, the upholstery segments 30, 31 of the respective side bolster 4, 5 have a hollow space 62 tapering in the elevation direction 25 extending towards an edge 59 into which the at least one cushion 28, 29 is typically embedded such that the two sides 60, 61 of the foam material embedded in the upholstery segment 30, 31 are pressed apart relative to the edge of the hollow space 16 upon deformation of the cushion 5. The two side bolsters 4 laterally border the backrest upholstery in the seat width direction 8. Upon closer examination, on the reverse side 58 of the backrest upholstery 2 at the tapered hollow space 62 is a widened hollow space area 63 with a more or less rectangular hollow space structure.

Figure 7:
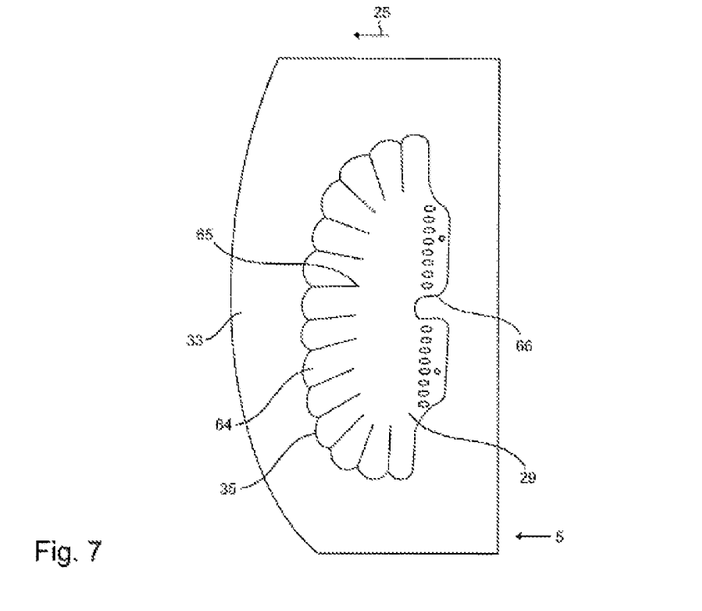
FIG. 7 Side view of a side bolster according to the invention with the contour of the inlaid cushion shown.

FIG. 7 shows a side bolster 5 in side perspective with the contour of a special embodiment of a cushion 29 according to the invention. In the elevation direction 25, 27, the upholstery segment 33 can be seen adjacent to the cushion. In the elevation direction on the outer side adjacent to the fillable area, the cushion 29 has plastic lamellae 64 with intermediate spaces 65. Where the fiber fabric 32 has its semicircular opening 36, the cushion also has a semicircular opening 66, through which a hose can be connected to the cushion 29. In this example embodiment, there are a total of thirteen plastic lamellae 64 with twelve intermediate spaces 65 arranged around the cushion. These have a flat, trapezoidal shape, the trapezoidal areas of which face in the same direction as the semicircular faces of the cushion 29. The intermediate spaces 65 are only very narrow and the trapezoidal shape is designed such that the plastic lamellae 64 are arranged almost form-fitting around the cushion. Their length in the elevation direction 25, 27 is between ⅓ and ⅔ of the maximum cushion elevation. Their essential task is to ensure the "bulge" caused by the bladder is diverted as homogeneously as possible. Their shape is very similar to an ellipse. Preferably, they dampen the expansion of the cushion 29 in the elevation direction 25, 27 and ensure the filling of the cushion with compressed air results primarily in an expansion in the seat width direction.

Figure 8:
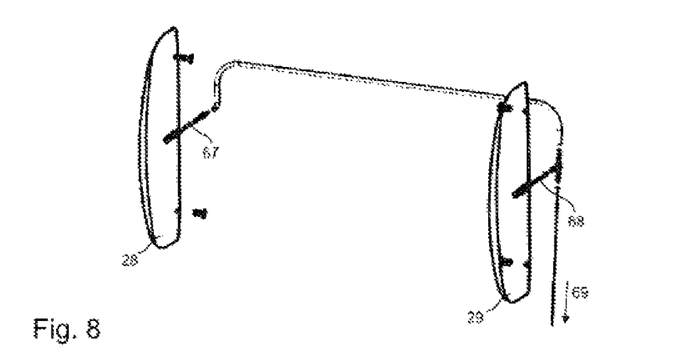
FIG. 8 Cushion with hose lines to a pump mechanism.

FIG. 8 shows example cushions 28, 29 with inlet elements 67, 68 that connect the cushion with an inlet or respectively outlet to a pump mechanism or respectively valve 69. The inlet elements 67, 68 are connected to the cushion through the semicircular opening 66. Fasteners 53 are to be found on the back structure at the flat border, near the corners.

Figure 9:
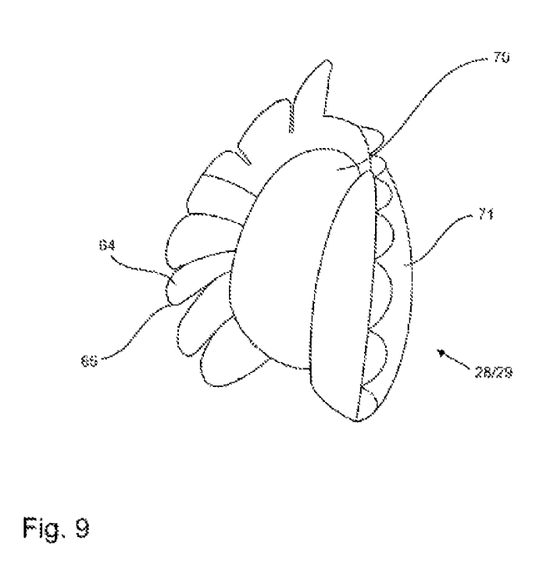
FIG. 9 Perspective view of an open cushion according to the invention consisting of two partial chambers.

FIG. 9 shows an example embodiment according to the invention of a cushion 28, 29 consisting of two partial chambers 70, 71, each with lamellae 64 and intermediate spaces 65 as shown in FIG. 8. These partial chambers are in the seat width direction arranged beside each other, are both semicircular in shape and are joined in hinge-like fashion at the straight border facing the framework 50 of the upholstery part such that the lamellae 64 of one partial chamber 70 move away from those of the other partial chamber 71 upon filling with compressed air when the semicircular partial chambers 70 and 71 expand in a bean shape. It is conceivable for the lamellae 64 in each of the partial chambers 70, 71 to be located in the middle of each of the partial chambers 70, 71 in the seat width direction. Preferably, however, they are located further inward from the middle of a partial chamber 70, 71 in the seat width direction, so that the bean-shaped expansion of the partial chambers predominates upon filling with compressed air. In another advantageous embodiment, the lamellae are arranged further outward in the seat width direction, so that the expansion predominates due to enlargement of the spacing of the lamellae in the two partial chambers 70, 71 upon filling with compressed air.

All features disclosed in the application documents are claimed as being essential to the invention, provided they are, individually or in combination, new over the prior art.

LIST OF REFERENCE NUMERALS

1 Vehicle seat
2 Seat cushion upholstery part
3 Backrest upholstery part
4, 5 Side bolsters of the backrest upholstery part
6, 7 Side bolsters of the seat cushion upholstery part
8 Handle
9 Rails
10 Cover of the seatbelt exit at the back
11, 12, 13, 14, 15 Switches
16 Lower side bolster upholstery segment
17 Upper side bolster upholstery segment 18 Upper backrest upholstery segment
19 Middle backrest upholstery segment
20, 21 Lower backrest upholstery segment
22 Length direction of the backrest upholstery part
23 Edge of a side bolster
24 Seat width direction
25 Elevation direction of a backrest upholstery segment (forward)
26 Seat cushion upholstery segment
27 Elevation direction of a seat cushion upholstery segment (upward)
28 Cushion 1
29 Cushion 2
30 Upholstery portion 1
31 Upholstery portion 2
32 Fiber fabric cushion 1
33 Fiber fabric cushion 2
34 Edge 1
35 Edge 2
36 Semicircular opening
37 Inner partial area of a first fiber fabric
38 Outer partial area of a first fiber fabric
39 Inner partial area of a second fiber fabric
40 Outer partial area of a second fiber fabric
41 Circular opening of the fiber fabric
42, 43, 44, 45 Corners of the pockets formed by the fiber fabric
46, 47 Overhanging partial area sections of the outer partial area 48, 49 Fasteners
50 Framework of the foaming tool
51 Fibers
52 Meshes
53 Fasteners
54 Projection on the fiber fabric
55 Recesses in the fiber fabric
56 Recesses in the fiber fabric
57 Length direction of the side bolster
58 Reverse side of the side bolster upholstery
59 Edge
60, 61 Sides of the material embedded in the upholstery segment
62 Hollow space
63 Widened hollow space area
64 Plastic lamellae
65 Intermediate space between plastic lamellae
66 Semicircular opening
67, 68 Inlet elements
69 Inlet/outlet to a pump mechanism or respectively valve
70, 71 Partial chambers of the cushion

What is claimed is:

1. A vehicle seat comprising:
a seat cushion upholstery part and a backrest upholstery part, wherein said seat cushion upholstery part and/or backrest upholstery part is bordered on each of the left and right sides by a deformable side bolster for supporting a vehicle seat occupant, wherein each side bolster comprises at least one cushion deformable in a seat width direction and at least one upholstery portion into which the at least one cushion is embedded,
wherein a fiber fabric is embedded two-dimensionally into a foam material of the at least one upholstery portion for its stabilization and at least partially covering the at least one embedded cushion, and wherein, in at least one part of an area covered by the fiber fabric, fibers of the fiber fabric are oriented at a non-zero-degree angle to a plane extending in the seat width direction and in an elevation direction of the side bolster, and
wherein the fiber fabric comprises an inner partial area and an outer partial area joined together at a midsection of an edge of the fiber fabric, wherein the shape of the inner partial area of the fiber fabric, in the seat width direction, is fashioned to the shape of the corresponding side of the cushion, while the outer partial area overlaps the edge of the fiber fabric such that protruding sections of the outer partial area can be folded over the edge of the fiber fabric towards the inner side of the seat in the seat width direction, where the protruding sections then overlap with the inner partial area.

2. The vehicle seat according to claim 1, wherein in at least part of the area covered by the fiber fabric, the fibres fibers of the fiber fabric are at an angle of between 15° and 75° to the plane extending in the seat width direction and in the elevation direction of the side bolster.

3. The vehicle seat according to claim 2, wherein in at least part of the area covered by the fiber fabric, the fibers of the fiber fabric are at an angle of between 25° and 65° to the plane extending in the seat width direction and in the elevation direction of the side bolster.

4. The vehicle seat according to claim 2, wherein in at least part of the area covered by the fiber fabric, the fibers of the fiber fabric are at an angle of between 40° and 50° to the plane extending in the seat width direction and in the elevation direction of the side bolster.

5. The vehicle seat according to claim 1, wherein the fiber fabric is a mesh grid with parallelogram-shaped, diamond-shaped, rectangular or square meshes.

6. The vehicle seat according to claim 1, wherein the respective side bolster is designed as an elongated elevation running essentially orthogonally to the seat width direction and the upholstery portion of which has, on an inner side of the side bolster, a hollow space tapering in the elevation direction extending towards an edge of the hollow space into which the at least one cushion is embedded such that two sides of the upholstery portion are pressed apart relative to the edge of the hollow space upon deformation of the cushion.

7. The vehicle seat according to claim 6, wherein the fiber fabric is embedded adjacent to the at least one cushion on a reverse side of the upholstery portion.

8. The vehicle seat according to claim 1, wherein the respective at least one cushion is designed as being inflatable.

9. The vehicle seat according to claim 8, wherein a pump apparatus is connected via a hose line to the respective at least one cushion in order to pump a fluid into the cushion and out of the cushion.

10. The vehicle seat according to claim 9, wherein the fluid is compressed air.

11. The vehicle seat according to claim 8, wherein the cushion comprises two partial chambers extending lengthwise in the elevation direction of the upholstery portion, wherein the two partial chambers are joined in the elevation direction of the upholstery portion such that the upholstery portion is pressed laterally outward upon filling.

12. The vehicle seat according to claim 1, wherein the fiber fabric comprises a plastic or textile material.

* * * * *